United States Patent
Arbeiter

(10) Patent No.: US 10,825,135 B2
(45) Date of Patent: Nov. 3, 2020

(54) METHOD AND DEVICE FOR DETERMINING A TRANSITION BETWEEN TWO DISPLAY IMAGES, AND VEHICLE

(71) Applicant: Conti Temic microelectronic GmbH, Nuremberg (DE)

(72) Inventor: Georg Arbeiter, Kueps (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 103 days.

(21) Appl. No.: 16/096,348

(22) PCT Filed: May 30, 2017

(86) PCT No.: PCT/DE2017/200046
§ 371 (c)(1),
(2) Date: Oct. 25, 2018

(87) PCT Pub. No.: WO2017/207001
PCT Pub. Date: Dec. 7, 2017

(65) Prior Publication Data
US 2019/0156456 A1    May 23, 2019

(30) Foreign Application Priority Data
Jun. 2, 2016 (DE) .......... 10 2016 209 662

(51) Int. Cl.
*G06T 3/40* (2006.01)
*G06T 13/80* (2011.01)
(Continued)

(52) U.S. Cl.
CPC .......... *G06T 3/4007* (2013.01); *B60R 1/002* (2013.01); *G06T 13/80* (2013.01); *G06T 15/10* (2013.01);
(Continued)

(58) Field of Classification Search
CPC .............. G06T 3/4007; G06T 13/80
See application file for complete search history.

(56) References Cited

U.S. PATENT DOCUMENTS

| 6,597,368 B1 * | 7/2003 | Arai ........................ G06T 13/20 345/420 |
| 8,994,719 B1 * | 3/2015 | Mudure ................ G06T 15/205 345/419 |
| 2008/0144968 A1 | 6/2008 | Cohen et al. |

FOREIGN PATENT DOCUMENTS

| DE | 102013209159 | 11/2014 |
| EP | 2 285 109 | 2/2011 |

OTHER PUBLICATIONS

English translation of the International Search Report of the International Searching Authority for International Application PCT/DE2017/200046, dated Oct. 11, 2017, 3 pages, European Patent Office, HV Rijswijk, Netherlands.

(Continued)

*Primary Examiner* — Tuan H Nguyen
(74) *Attorney, Agent, or Firm* — W. F. Fasse

(57) ABSTRACT

In a method for determining a transition between two display images, a two-dimensional initial image is mapped by first and second mapping functions respectively onto first and second mapped images, and the first and second mapped images are mapped respectively onto a first display image. The initial image is mapped by an interpolating mapping function onto an interpolating mapped image in the model space, wherein the interpolating mapped image is determined by interpolation of the first and second mapped images as a function of an interpolation parameter. The initial image, mapped by the interpolating mapping function onto the interpolating mapped image, is mapped onto an interpolating display image which transitions from the first (Continued)

display image to the second display image through variation of the interpolation parameter.

15 Claims, 4 Drawing Sheets

(51) Int. Cl.
    *G06T 15/10*     (2011.01)
    *B60R 1/00*     (2006.01)
    *H04N 5/341*     (2011.01)

(52) U.S. Cl.
    CPC ...... *H04N 5/3415* (2013.01); *B60R 2300/105* (2013.01); *B60R 2300/303* (2013.01); *B60R 2300/306* (2013.01); *B60R 2300/8093* (2013.01); *G06T 2210/44* (2013.01)

(56) References Cited

OTHER PUBLICATIONS

PCT International Preliminary Report on Patentability including English Translation of PCT Written Opinion of the International Searching Authority for International Application PCT/DE2017/200046, dated Dec. 4, 2018, 6 pages, International Bureau of WIPO, Geneva, Switzerland.

German Search Report for German Patent Application No. 10 2016 209 662.1, dated Apr. 10, 2017, 10 pages, German Patent and Trademark Office, Muenchen, Germany, with partial English translation, 7 pages.

Takashi Kanai et al., "Metamorphosis of Arbitrary Triangular Meshes", IEEE Computer Graphics and Applications, IEEE Service Center, New York, NY, US, vol. 20, No. 2, Mar. 1, 2000, XP002903656, ISSN: 0272-1716, pp. 62-75.

Alla Sheffer et al., "Pyramid Coordinates for Morphing and Deformation", Proceedings of the 2nd International Symposium on 3D Data Processing, Visualization, and Transmission (3DPVT'04), Thessaloniki, Greece, Sep. 6-9, 2004, XP010725056, ISBN: 978-0-7695-2223-4, pp. 68-75.

Fujitsu Semiconductor America, Inc., "360° Wrap-Around Video Imaging Technology Ready for Integration with Fujitsu Graphics SoCs", Jan. 1, 2014, XP 055406437, GDC-AN-21436-3/2014, retrieved from the internet: URL:https://www.fujitsu.com/us/Images/360_OmniView_AppNote.pdf, retrieved on Sep. 13, 2017, 7 pages.

Robert L. Blanding et al., "Skeleton-Based Three-Dimensional Geometric Morphing", Computational Geometry, vol. 15, 2000, pp. 129 to 148.

Xiaobai Chen et al., "Non-Parametric Texture Transfer Using MeshMatch" Adobe Technical Report No. 2012-2, available in the Internet starting in 2013 at the URL http://web.archive.org/web/20130101000000*/http://www.danbgoldman.com/misc/meshmatch/meshmatch.pdf, researched on Apr. 6, 2017, pp. 1 to 9.

Denis Kravtsov et al., "Controlled Metamorphosis Between Skeleton-Driven Animated Polyhedral Meshes of Arbitrary Topologies", Computer Graphics forum, vol. 33, 2014, pp. 64 to 72.

\* cited by examiner

METHOD AND DEVICE FOR DETERMINING A TRANSITION BETWEEN TWO DISPLAY IMAGES, AND VEHICLE

FIELD OF THE INVENTION

The invention relates to a method for determining a transition between two display images, an image processing device for determining a transition between two display images, and a vehicle.

BACKGROUND INFORMATION

Surround view systems for vehicles generate camera images which detect a wide area around the vehicle. For instance, DE 102013209159 B4 discloses a corresponding surround view camera with fisheye optics.

Such camera images are however mostly not suitable for direct display due to the severe distortion they suffer, which gives them an unnatural appearance, and they therefore have to be transformed accordingly. To this end, the camera image may be transformed into various views. For instance, a fisheye view which is severely distorted at the margins and provides the driver with a quick overview may, on the one hand, be selected. On the other hand, the camera image may be transformed into a perspective view, so as to enable a good assessment of the actual position of the mapped objects.

It is then possible to alternate between display images with different views, for example by cutting sharply between them. However, this is associated with the risk of the driver becoming confused by the rapid, unexpected transition.

SUMMARY OF THE INVENTION

It is therefore an object of the invention to enable a continuous and uniform transition between two display images.

This object can be achieved according to the invention by a method for determining a transition between two display images, an image processing device for determining a transition between two display images, and a vehicle, respectively having the inventive features as set forth herein.

According to a first aspect, the invention accordingly relates to a method for determining a transition between two display images. In this case, a two-dimensional initial image is mapped by means of a first mapping function onto a first mapped image in a three-dimensional model space and the first mapped image is mapped onto a first display image. The two-dimensional initial image is mapped by means of a second mapping function onto a second mapped image in the three-dimensional model space and the second mapped image is mapped onto a second display image. The initial image is mapped by means of an interpolated mapping function onto an interpolated mapped image in the model space, wherein the interpolated mapped image is determined by interpolation of the first mapped image and the second mapped image as a function of an interpolation parameter. The initial image, mapped by means of the interpolated mapping function onto the interpolated mapped image, is mapped onto an interpolated display image which transitions from the first display image to the second display image through variation of the interpolation parameter.

According to a second aspect, the invention accordingly provides an image processing device for determining a transition between two display images. The image processing device comprises a first image generating means, which is configured to map a two-dimensional initial image onto a first mapped image in a three-dimensional model space by means of a first mapping function and to map the first mapped image onto a first display image. The image processing means further comprises a second image generating means, which is configured to map the initial image onto a second mapped image in the three-dimensional model space by means of a second mapping function and to map the second mapped image onto a second display image. The image processing means comprises an interpolation means which is configured to map the initial image onto an interpolated mapped image in the model space by means of an interpolated mapping function, wherein the interpolation means is configured to determine the interpolated mapped image by interpolation of the first mapped image and the second mapped image as a function of an interpolation parameter. The image processing means further comprises a transitional image generating means, which is configured to map the initial image, mapped by means of the interpolated mapping function onto the interpolated mapped image, onto an interpolated display image, which transitions from the first display image to the second display image through variation of the interpolation parameter.

According to a third aspect, the invention provides a vehicle which has at least one camera means which is configured to generate an initial image. The vehicle further comprises an image processing device for determining a transition between two display images on the basis of the generated initial image.

The invention makes it possible to alternate between two display images continuously using a very quick, efficient algorithm, by already interpolating the corresponding images in the model space. Through variation of the interpolation parameter, the first display image thereby transitions continuously and evenly into the second display image.

According to a preferred further development of the method, the interpolated mapping function is determined by interpolation of the first mapping function and second mapping function as a function of the interpolation parameter. The interpolated mapping function may thereby be calculated quickly and makes it possible to determine the interpolated mapped image on the basis of the initial image.

According to a preferred further development of the method, the three-dimensional model space comprises a grid. The first mapped image has a first set of grid points of the grid, wherein the first mapping function is determined on the basis of first texture coordinates of the grid points of the first set of grid points. The second mapped image has a second set of grid points of the grid, wherein the second mapping function is determined on the basis of second texture coordinates of the grid points of the second set of grid points. The texture coordinates contain both coordinates of the grid point in the grid and the corresponding coordinates of the initial image. A unique point or a unique pixel of the initial image is thus preferably associated with each first and second grid point respectively and preferably also vice versa, such that pixels of the initial image may be mapped onto the corresponding mapped image by means of the texture coordinates.

According to a preferred further development of the method, each grid point of the first set of grid points is associated with one grid point of the second set of grid points, wherein the interpolated mapped image is determined for each grid point of the first set of grid points by interpolation with the associated grid point of the second set of grid points. The interpolated mapping function is determined for each grid point of the first set of grid points by interpolation of the corresponding first texture coordinates with the second texture coordinates of the associated grid point of the second set of grid points. This enables a unique transition of the first mapped image to the second mapped image, since each grid point of the first set of grid points is linked with a unique grid point of the second set of grid points.

According to a preferred further development of the method, association of a respective grid point of the second set of grid points with each grid point of the first set of grid points is performed by means of a nearest neighbor search.

According to a preferred further development of the method, mapping of the initial image, mapped by means of the interpolated mapping function onto the interpolated mapped image, onto the interpolated display image comprises determining a first camera map and a second camera map which map the initial image projected onto the first mapped image and second mapped image respectively onto the first display image and second display image. An interpolated camera map is further determined which maps the initial image, mapped by means of the interpolated mapping function onto the interpolated mapped image, onto the interpolated display image, wherein the interpolated camera map is dependent on the interpolation parameter. The respective camera map corresponds to corresponding virtual cameras in the model space, such that the images may be mapped onto the respective display image from various perspectives or viewing angles.

According to a preferred further development of the method, determination of the interpolated camera map comprises interpolation of the first camera map and second camera map.

According to a preferred further development of the method, determination of the first camera map and second camera map comprises concatenation respectively of a first and second transformation map with a first and second projection map. The first and second transformation maps map the first and second mapped images respectively onto transformed first and second mapped images. The first and second projection maps project the transformed first and second mapped images respectively onto the first and second display images. The transformation maps preferably comprise rotation or translation of the first mapped image and second mapped image onto corresponding transformed images and thereby enable a plurality of perspective views of the respective display image.

According to one preferred further development of the method, determination of the interpolated camera map comprises concatenation of an interpolated transformation map with an interpolated projection map. The interpolated transformation map is determined by interpolation of the first transformation map and second transformation map as a function of the interpolation parameter. The interpolated projection map is determined by interpolation of the first projection map and second projection map as a function of the interpolation parameter.

According to a preferred further development of the method, the interpolated mapped image and/or the interpolated mapping function is/are determined by linear or polynomial interpolation.

According to a preferred further development, the image processing device comprises an image display means, which is configured to display the interpolated display image.

According to a preferred further development of the image processing device, the interpolation means is configured to determine the interpolated mapping function by interpolation of the first mapping function and second mapping function as a function of the interpolation parameter.

According to a preferred further development of the image processing device, the interpolation means is configured to determine the interpolated mapped image and/or the interpolated mapping function by linear or polynomial interpolation.

BRIEF DESCRIPTION OF THE DRAWINGS

The present invention is explained in greater detail below on the basis of the exemplary embodiments indicated in the schematic figures which make up the drawings, in which.

DETAILED DESCRIPTION OF EXAMPLE EMBODIMENTS OF THE INVENTION

Figure 1:
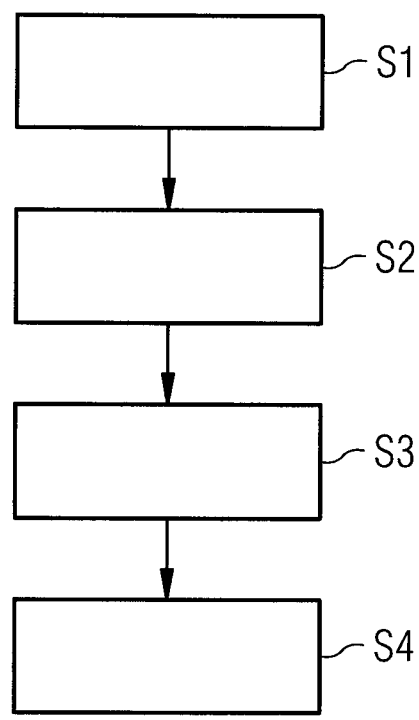
FIG. 1 shows a flow chart for explaining a method for determining a transition between two display images according to one embodiment of the invention.

FIG. 1 shows a flow chart for explaining a method for determining a transition between two display images according to one embodiment of the invention.

Figure 2:
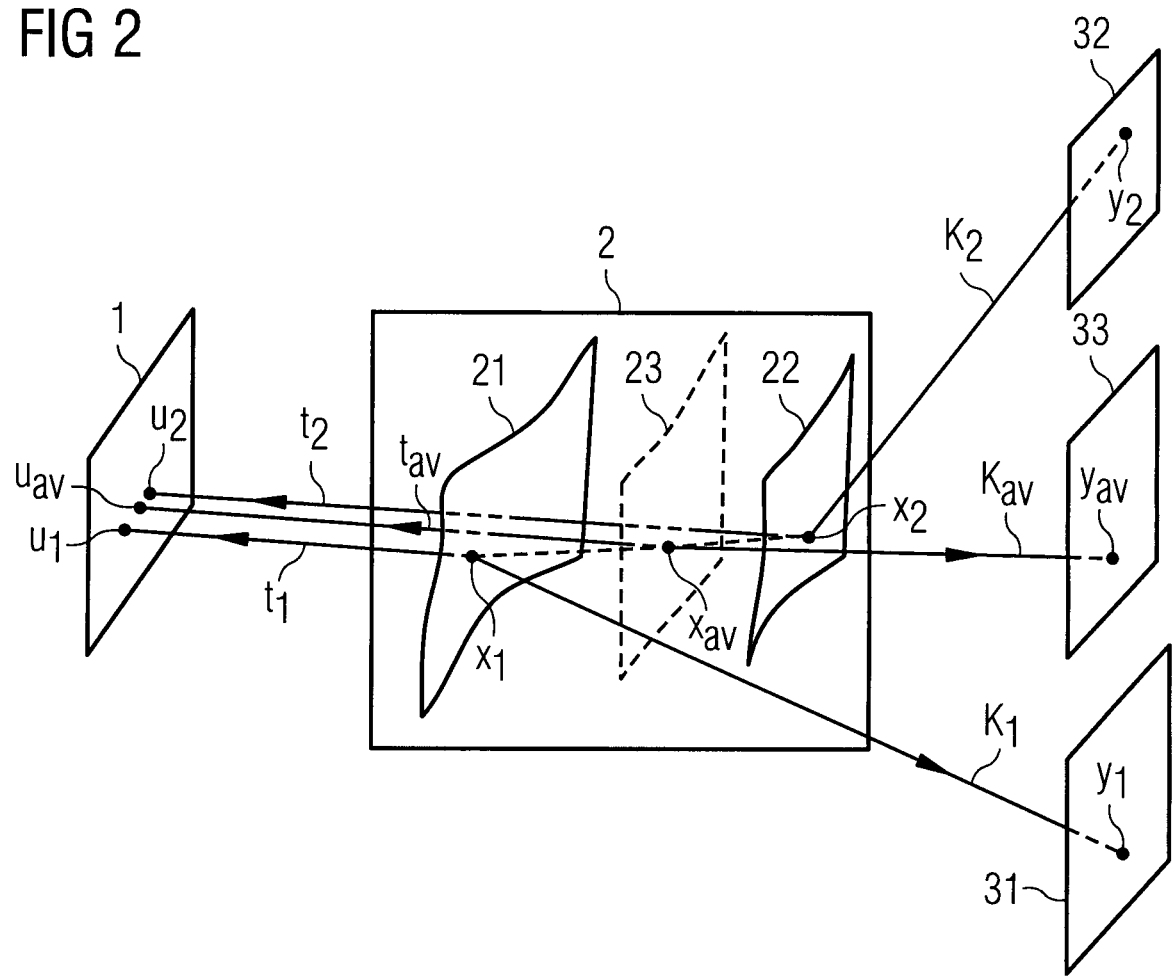
FIG. 2 is a schematic view for explaining the generation of a first display image, a second display image and an interpolated display image.

The method is explained in greater detail below on the basis of the schematic view shown in FIG. 2.

In a first method step S1, a two-dimensional initial image 1 is mapped by means of a first mapping function onto a first mapped image 21 in a three-dimensional model space 2 and the first mapped image 21 is then mapped onto a first display image 31, as is explained in greater detail below.

The initial image 1 may for example be a camera image, which is generated on the basis of camera data from one or more vehicle cameras. The three-dimensional model space 2 comprises a grid with a plurality of grid points. The first mapped image 21 is determined by a first set of grid points $x_1$, with which respective first texture coordinates $t_1$ are associated. The first texture coordinates $t_1$ comprise three-dimensional grid coordinates of the grid point $x_1$ and two-dimensional initial image coordinates $u_1$ of the initial image 1. The first texture coordinates $t_1$ thus serve to associate the grid points $x_1$ of the first mapped image 21 with initial image coordinates $u_1$ of the initial image 1. Conversely, on the basis of the first texture coordinates $t_1$, the initial image coordinates $u_1$ of the initial image 1 may be mapped by inversion onto the grid points $x_1$ of the first image 21. A first mapping function is thus determined on the basis of the first texture coordinates $t_1$, with this function mapping the initial image 1 onto the first mapped image 21.

The first grid points $x_1$ are preferably generated by matrix-vector multiplication of a first model matrix M1 with first model coordinates $v_1$, as expressed by the following formula:

$$x_1 = M_1 v_1.$$

This step is however optional. In particular, the model matrix M1 may be an identity matrix.

Mapping of the first mapped image 21 onto the first display image 31 proceeds by means of a first camera map K1, which is formed by concatenation of a first transformation map V1 and a first projection map P1, as expressed by the following formula:

$$K_1 = P_1 V_1.$$

To this end, the first grid points x1 are represented as four-dimensional vectors, the first three entries of which correspond to the three-dimensional grid coordinates of the grid point x1 while the last entry is set at equal to one. The first transformation map V1 is represented as a 4×4 matrix, which takes the following form:

$$V_1 = \begin{pmatrix} A & b \\ 0 & 1 \end{pmatrix},$$

wherein A is a 3×3 matrix, which represents rotation, b is a three-component column vector, which represents translation, and the 0 represents a three-component row vector with zero entries. The transformation map V1 acts by matrix-vector multiplication on the grid point x1 according to the following formula:

$$V_1 x_1,$$

whereby a transformed grid point is generated, the fourth component of which is again equal to 1. The transformation map V1 thus maps the first mapped image 21 onto a transformed first mapped image.

The first projection map P1 projects the transformed grid point onto first display image coordinates y1, which are represented by a two-dimensional vector and correspond to coordinates of the first display image 31. The first projection map P1 may for example be represented as a 2×4 matrix, which for example projects onto the first two components. The following therefore applies:

$$K_1 x_1 = P_1 V_1 x_1 = y_1.$$

The first camera map K1 thus maps the grid point x1 onto a point or a pixel of the first display image 31. By mapping all the grid points x1 of the first mapped image 21 onto the first display image 31, the latter is built up and generated. The first projection map P1 thus projects the transformed first mapped image onto the first display image 31.

In a second method step S2, the two-dimensional initial image 1 is mapped by means of a second mapping function onto a second mapped image 22 in the three-dimensional model space 2 and the second mapped image 22 is mapped onto a second display image 32. In a manner similar to the above-described first method step, the second method step may comprise mapping of the initial image 1 onto a second mapped image 22 by means of second texture coordinates t2 of grid points x2 of a second set of grid points. The second texture coordinates t2 associate corresponding second initial image coordinates u2 with the second grid points x2. The second set of grid points x2 preferably differs at least in part from the first set of grid points x1. The first mapped image 21 and the second mapped image 22 thus correspond to projections of the initial image 1 onto different surfaces in the model space 2 which pass through the grid coordinates of the first mapped image 21 or second mapped image 22.

Mapping of the second mapped image 22 onto the second display image 32 proceeds by means of a second camera map K2, which is formed, as described above, by concatenation of a second transformation map V2 and a second projection map P2. According to one embodiment, the second transformation map V2 is identical to the first transformation map V1 and/or the second projection map P2 is identical to the first projection map P1.

In a third method step S3, the initial image 1 is mapped by means of an interpolated mapping function onto an interpolated mapped image 23 in the model space 2.

To this end, first of all each grid point x1 of the first set of grid points (hereinafter designated "first grid point") has associated with it a grid point x2 of the second set of grid points which is designated "second grid point". The second grid point x2 may preferably be determined by a nearest neighbor search, such that that grid point x2 of the second set of grid points is associated with the first grid point x1 which is at the smallest distance in the model space 2. Precisely one second grid point x2 is preferably associated with each first grid point x1.

For each first grid point x1 of the first set of grid points, interpolated grid points xw of the interpolated mapped image 23 are generated by linear interpolation of the first grid point x1 with the associated second grid point x2, as may be expressed by the following formula:

$$x_w = w \cdot x_1 + (1-w) \cdot x_2.$$

In this case, w is an interpolation parameter, which is variable between 0 and 1. If the first and second grid points x1, x2 are generated by means of model matrices M1, M2, the following formula applies:

$$x_w = w \cdot M_1 v_1 + (1-w) \cdot M_2 v_2.$$

The interpolated grid points xw are thus dependent on the interpolation parameter w and interpolate linearly between the first grid point x1 (where w=1) and the second grid point x2 (where w=0). According to further embodiments, any desired other interpolation method, in particular a quadratic or polynomial interpolation method, may also be selected.

Interpolated texture coordinates tw are associated with each interpolated grid point xw by linear interpolation of the first texture coordinates t1 of the first grid point x1 and second texture coordinates t2 of the second grid point x2, as may be expressed by the following formula:

$$t_w = w \cdot t_1 + (1-w) \cdot t_2.$$

The interpolated texture coordinates tw are dependent on the interpolation parameter w and interpolate linearly between the texture coordinates t1 of the first grid point x1 (where w=1) and the texture coordinates t2 of the second grid point x2 (where w=0). In turn, another, in particular quadratic or polynomial interpolation method, is also possible. The same interpolation method is preferably selected for determination of the interpolated grid points xw and for determination of the interpolated texture coordinates tw.

The interpolated texture coordinates tw yield a relationship between the corresponding interpolated grid point xw and corresponding interpolated initial image coordinates uw of the initial image 1 for any desired value of the interpolation parameter w. Conversely, the initial image 1 may be mapped onto the interpolated mapped image 23 by means of the interpolated texture coordinates tw. On the basis of the interpolated texture coordinates tw, an interpolated mapping function may thus be determined which maps the initial image 1 onto the interpolated mapped image 23.

In a further method step S4, the initial image 1, mapped by means of the interpolated mapping function onto the interpolated mapped image 23, is mapped onto an interpolated display image 33. The interpolated display image 33 transitions through variation of the interpolation parameter w from the first display image 31 to the second display image 32.

Mapping of the interpolated mapped image 23 onto the interpolated display image 33 proceeds by means of an interpolated camera map Kw, which is dependent on the interpolation parameter w and interpolates between the first camera map K1 and the second camera map K2.

According to one embodiment, the interpolated camera map Kw is determined by linear interpolation of the first camera map K1 and the second camera map K2 according to the following formula:

$$K_w = w \cdot K_1 + (1-w) \cdot K_2.$$

According to a further embodiment, an interpolated transformation map Vw is determined by linear interpolation of the first transformation map V1 and the second transformation map V2 according to the following formula:

$$V_w = w \cdot V_1 + (1-w) \cdot V_2.$$

Moreover, an interpolated projection map Pw is determined by linear interpolation of the first projection map P1 with the second projection map P2:

$$P_w = w \cdot P_1 + (1-w) \cdot P_2.$$

The interpolated camera map Kw is then determined by concatenation of the interpolated transformation map Vw and the interpolated projection map Pw, as expressed by the following formula:

$$K_w = V_w P_w.$$

The interpolated camera map Kw interpolates continuously between the first camera map K1 (where w=1) and the second camera map K2 (where w=0).

Figure 3:
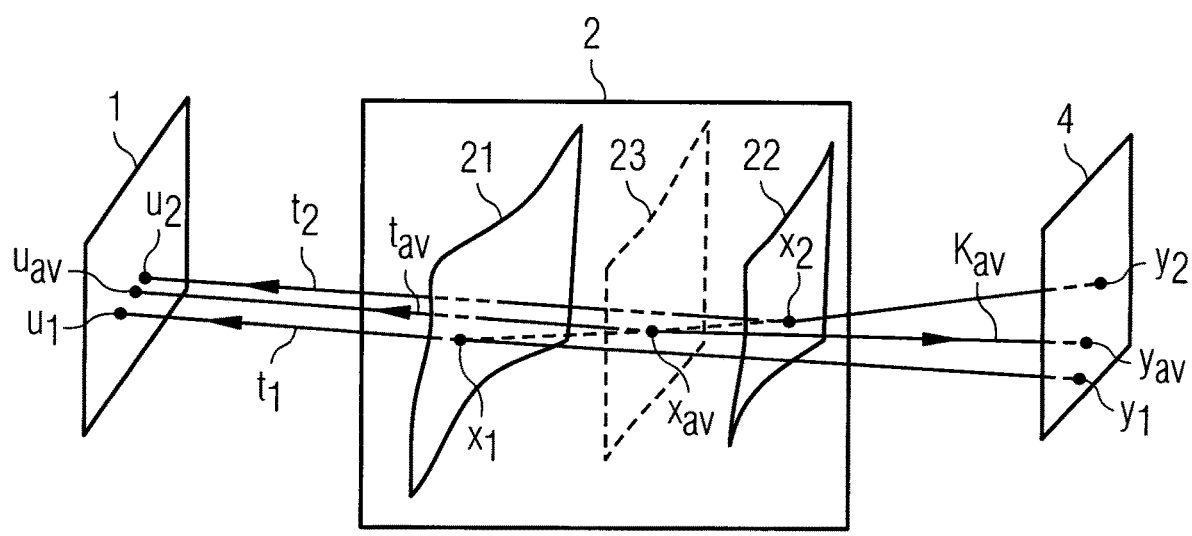
FIG. 3 is a schematic view for explaining the display of the first display image, the second display image and the interpolated display image on a display means.

FIG. 3 shows a schematic view for explaining the display of the interpolated display image 33 on a display means 4, in particular a vehicle display in a vehicle. To this end, the interpolation parameter w is continuously varied between 0 and 1. For a value of the interpolation parameter w equal to 1, the first initial image coordinates u1 are for example mapped onto first display image coordinates y1. If this is performed for all the first initial image coordinates u1, the initial image 1 is mapped via the first mapped image 21 onto the first display image 31 and displayed on the display means 4.

If the interpolation parameter w is then reduced, the image displayed on the display means 4 changes continuously. Thus, for example, for a specific value of the display parameter w between 0 and 1, corresponding interpolated initial image coordinates uw are mapped onto corresponding interpolated display image coordinates yw. If this is carried out for all the interpolated initial image coordinates uw, the initial image 1 is mapped via the interpolated mapped image 23 onto the interpolated display image 33 and displayed on the display means 4.

For a value of the interpolation parameter w equal to 0, the initial image 1 is finally mapped onto the second display image 32 and displayed on the display means 4.

Figure 4:
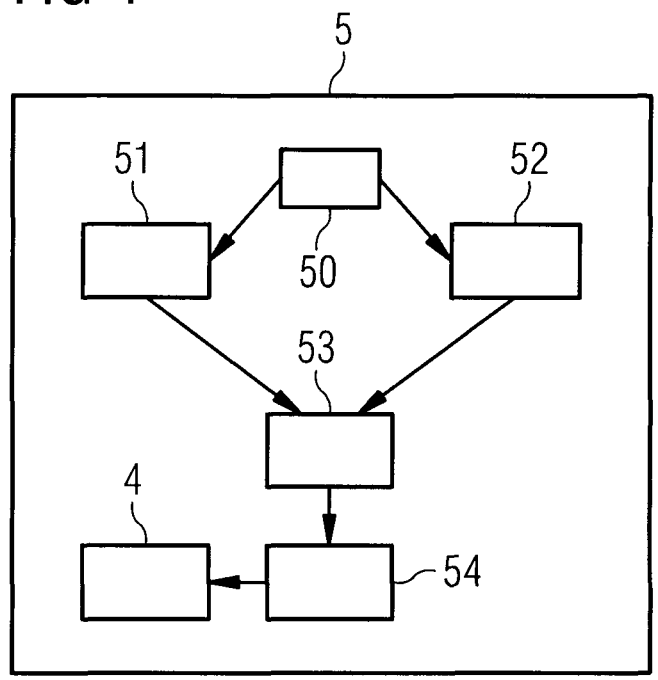
FIG. 4 shows a schematic block diagram of an image processing device for determining a transition between two display images according to one embodiment of the invention.

FIG. 4 illustrates a schematic block diagram of an image processing device 5 for determining a transition between two display images according to one embodiment of the invention.

The image processing device 5 comprises an interface 50 for receiving a two-dimensional initial image 1, which may be provided for example by an external camera means and stored on a storage device of the image processing device 5.

The image processing device 5 further comprises a first image generating means 51, which maps the initial image 1 by means of a first mapping function onto a first mapped image 21 in a three-dimensional model space 2 and maps the first mapped image 21 onto a first display image 3. The image generating means 51 comprises a processor, which calculates and performs the corresponding mapping steps. The image generating means 51 may generate the first display image 3 in particular on the basis of the above-described first texture coordinates t1 and the first camera map K1.

The image processing device 5 further comprises a second image generating means 52, which maps the initial image 1 by means of a second mapping function onto a second mapped image 22 in the three-dimensional model space 2 and maps the second mapped image 22 onto a second display image 4, again preferably on the basis of the above-described second texture coordinates t2 and the second camera map K2.

The image processing device 5 further comprises an interpolation means 53, which maps the initial image 1 by means of an interpolated mapping function onto an interpolated mapped image 23 in the model space 2 and determines the interpolated mapped image 23 by interpolation of the first mapped image 21 and the second mapped image 22 as a function of an interpolation parameter w. The interpolation means 53 preferably determines the interpolated mapped image 23 according to one of the above-described methods.

The image processing device 5 comprises a transitional image generating means 54, which maps the initial image 1, mapped by means of the interpolated mapping function onto the interpolated mapped image 23, onto an interpolated display image 33 which transitions from the first display image 31 to the second display image 32 through variation of the interpolation parameter w. The image processing device 5 comprises an image display means 4 as described above, which is configured to display the interpolated display image 33. According to one embodiment, the first image generating means 51, the second image generating means 52, the interpolation means 53 and/or the transitional image generating means 54 are identical to one another and may for example be part of a computing unit or a processor.

Figure 5:
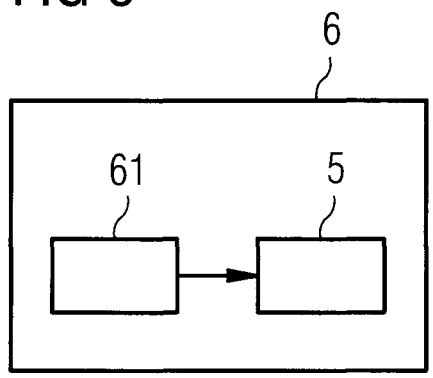
FIG. 5 shows a schematic block diagram of a vehicle according to one embodiment of the invention.

FIG. 5 shows a schematic block diagram of a vehicle 6 according to one embodiment of the invention. The vehicle 6 comprises a camera means 61, which is configured to generate an initial image. The vehicle 6 further comprises an image processing device 5 for determining a transition between two display images 31, 32 on the basis of the generated initial image 1, in particular according to one of the above-described embodiments.

LIST OF REFERENCE NUMERALS

1 Initial image
2 Three-dimensional model space
21 First mapped image
22 Second mapped image
31 First display image
32 Second display image
33 Interpolated display image
4 Display means
5 Image processing device
51 First image generating means
52 Second image generating means
53 Interpolation means
54 Transitional image generating means
K1 First camera map K2 Second camera map
Kw Interpolated camera map
t1 First texture coordinates
t2 Second texture coordinates
tw Interpolated texture coordinates
u1 First initial image coordinates
u2 Second initial image coordinates
uw Interpolated initial image coordinates
P1 First projection map
P2 Second projection map
Pw Interpolated projection map
V1 First transformation map
V2 Second transformation map
Vw Interpolated transformation map
w Interpolation parameter
x1 First grid point
x2 Second grid point
xw Interpolated grid point
y1 First display image coordinates
y2 Second display image coordinates
yw Interpolated display image coordinates

The invention claimed is:

1. A method of determining a transition between two display images, comprising the steps:
    mapping a two-dimensional initial image by a first mapping function onto a first mapped image in a three-dimensional model space, and mapping the first mapped image onto a first display image;
    mapping the two-dimensional initial image by a second mapping function onto a second mapped image in the three-dimensional model space and mapping the second mapped image onto a second display image;
    mapping the two-dimensional initial image by an interpolating mapping function onto an interpolating mapped image in the three-dimensional model space, wherein the interpolating mapped image is determined by interpolating the first mapped image and the second mapped image dependent on an interpolation parameter; and
    mapping the two-dimensional initial image, which has been mapped by the interpolating mapping function onto the interpolating mapped image, onto an interpolating display image which transitions from the first display image to the second display image by varying the interpolation parameter;
    wherein the mapping of the two-dimensional initial image, which has been mapped by the interpolating mapping function onto the interpolating mapped image, onto the interpolating display image comprises the following sub-steps:
    determining a first camera map and a second camera map that respectively map the two-dimensional initial image, which has been mapped onto the first mapped image and onto the second mapped image respectively, onto the first display image and onto the second display image respectively; and
    determining an interpolating camera map that maps the two-dimensional initial image, which has been mapped by the interpolating mapping function onto the interpolating mapped image, onto the interpolating display image dependent on the interpolation parameter.

2. The method according to claim 1, wherein the interpolating mapping function is determined by interpolation of the first mapping function and the second mapping function as a function of dependent on the interpolation parameter.

3. The method according to claim wherein the determining of the interpolating camera map comprises interpolating the first camera map and the second camera map.

4. The method according to claim 1,
    wherein the determining of the first camera map and the second camera map comprises concatenating a first transformation map and a second transformation map respectively with a first projection map and a second projection map;
    wherein the first transformation map and the second transformation map respectively map the first and second mapped images respectively onto transformed first and second mapped images; and
    wherein the first and second projection maps project the transformed first and second mapped images respectively onto the first and second display images.

5. The method according to claim 4,
    wherein the determining of the interpolating camera map comprises concatenating an interpolating transformation map with an interpolating projection map;
    further comprising determining the interpolating transformation map by interpolating the first transformation map and the second transformation map dependent on the interpolation parameter; and
    further comprising determining the interpolating projection map by interpolating the first projection map and second projection map dependent on the interpolation parameter.

6. The method according to claim 1, wherein the interpolating mapped image and/or the interpolating mapping function is/are determined by linear or polynomial interpolation.

7. A method of determining a transition between two display images, comprising the steps:
    mapping a two-dimensional initial image by a first mapping function onto a first mapped image in a three-dimensional model space, and mapping the first mapped image onto a first display image;
    mapping the two-dimensional initial image by a second mapping function onto a second mapped image in the three-dimensional model space and mapping the second mapped image onto a second display image;
    mapping the two-dimensional initial image by an interpolating mapping function onto an interpolating mapped image in the three-dimensional model space, wherein the interpolating mapped image is determined by interpolating the first mapped image and the second mapped image dependent on an interpolation parameter; and
    mapping the two-dimensional initial image, which has been mapped by the interpolating mapping function onto the interpolating mapped image, onto an interpolating display image which transitions from the first display image to the second display image by varying the interpolation Parameter;
    wherein the three-dimensional model space comprises a grid;
    wherein the first mapped image has a first set of grid points of the grid, and the first mapping function is determined based on first texture coordinates of grid points of the first set of grid points; and
    wherein the second mapped image has a second set of grid points of the grid, and the second mapping function is determined based on second texture coordinates of grid points of the second set of grid points.

8. The method according to claim 7,
further comprising associating a respective grid point of the second set of grid points to each respective grid point of the first set of grid points;
wherein the interpolating mapped image is determined for each grid point of the first set of grid points by interpolation with the respective associated grid point of the second set of grid points; and
wherein the interpolating mapping function is determined for each grid point of the first set of grid points by interpolation of the corresponding first texture coordinates with the second texture coordinates of the respective associated grid point of the second set of grid points.

9. The method according to claim 8, wherein the associating of the respective associated grid point of the second set of grid points to the respective grid point of the first set of grid points is performed by a nearest neighbor search.

10. An image processing device for determining a transition between two display images, comprising:
a first image generating device configured to map a two-dimensional initial image onto a first mapped image in a three-dimensional model space by a first mapping function, and to map the first mapped image onto a first display image;
a second image generating device configured to map the two-dimensional initial image onto a second mapped image in the three-dimensional model space by a second mapping function and to map the second mapped image onto a second display image;
an interpolation device configured to map the two-dimensional initial image by an interpolating mapping function onto an interpolating mapped image in the three-dimensional model space, and to determine the interpolating mapped image by interpolating the first mapped image and the second mapped image dependent on an interpolation parameter; and
a transitional image generating device configured to map the two-dimensional initial image, which has been mapped by the interpolating mapping function onto the interpolating mapped image, onto an interpolating display image which transitions from the first display image to the second display image by varying the interpolation parameter;
wherein the transitional image generating device is configured to map the two-dimensional initial image, which has been mapped by the interpolating mapping function onto the interpolating mapped image, onto the interpolating display image by:
determining a first camera map and a second camera map that respectively map the two-dimensional initial image, which has been mapped onto the first mapped image and onto the second mapped image respectively, onto the first display image and onto the second display image respectively; and
determining an interpolating camera map which maps the two-dimensional initial image, which has been mapped by the interpolating mapping function onto the interpolating mapped image, onto the interpolating display image dependent on the interpolation parameter.

11. The image processing device according to claim 10, further comprising an image display device configured to display the interpolating display image.

12. The image processing device according to claim 10, wherein the interpolation device is configured to determine the interpolating mapping function by interpolation of interpolating the first mapping function and the second mapping function dependent on the interpolation parameter.

13. The image processing device according to claim 10, wherein the interpolation device is configured to determine the interpolating mapped image and/or the interpolating mapping function by linear or polynomial interpolation.

14. A vehicle, comprising:
the image processing device according to claim 10; and
a camera configured to generate the two-dimensional initial image.

15. An image processing device for determining a transition between two display images, comprising:
a first image generating device configured to map a two-dimensional initial image onto a first mapped image in a three-dimensional model space by a first mapping function, and to map the first mapped image onto a first display image;
a second image generating device configured to map the two-dimensional initial image onto a second mapped image in the three-dimensional model space by a second mapping function and to map the second mapped image onto a second display image;
an interpolation device configured to map the two-dimensional initial image by an interpolating mapping function onto an interpolating mapped image in the three-dimensional model space, and to determine the interpolating mapped image by interpolating the first mapped image and the second mapped image dependent on an interpolation parameter; and
a transitional image generating device configured to map the two-dimensional initial image, which has been mapped by the interpolating mapping function onto the interpolating mapped image, onto an interpolating display image which transitions from the first display image to the second display image by varying the interpolation parameter;
wherein the three-dimensional model space comprises a grid;
wherein the first mapped image has a first set of grid points of the grid, and the first mapping function is determined based on first texture coordinates of grid points of the first set of grid points; and
wherein the second mapped image has a second set of grid points of the grid, and the second mapping function is determined based on second texture coordinates of grid points of the second set of grid points.

* * * * *

UNITED STATES PATENT AND TRADEMARK OFFICE
CERTIFICATE OF CORRECTION

PATENT NO. : 10,825,135 B2  
APPLICATION NO. : 16/096348  
DATED : November 3, 2020  
INVENTOR(S) : Georg Arbeiter Page 1 of 1

It is certified that error appears in the above-identified patent and that said Letters Patent is hereby corrected as shown below:

In the Claims

Column 9,  
Claim 2, Line 67, before "dependent", delete "as a function of";

Column 10,  
Claim 3, Line 1, after "claim", insert --1,--;

Column 12,  
Claim 12, Line 8, after "function by", delete "interpolation of".

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*